Figure 1:
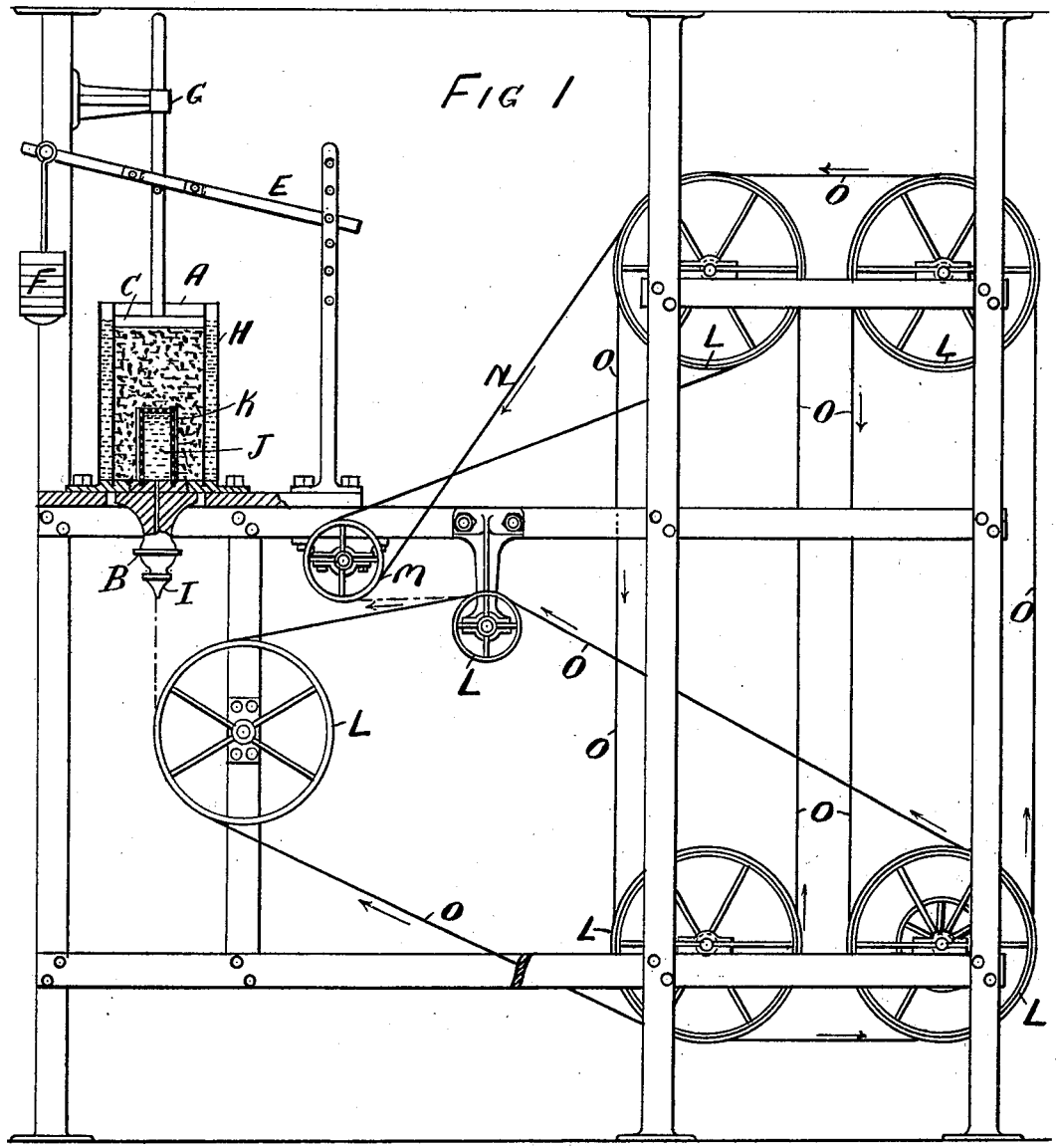

(No Model.) 2 Sheets—Sheet 1.

A. MILLAR.
PROCESS OF OBTAINING USEFUL PRODUCTS FROM SILKWORMS.

No. 594,888. Patented Dec. 7, 1897.

Witnesses:
E. B. Bolton

Inventor:
Adam Millar
By Richards
his Attorneys (No Model.) 2 Sheets—Sheet 2.
A. MILLAR.
PROCESS OF OBTAINING USEFUL PRODUCTS FROM SILKWORMS.
No. 594,888. Patented Dec. 7, 1897.
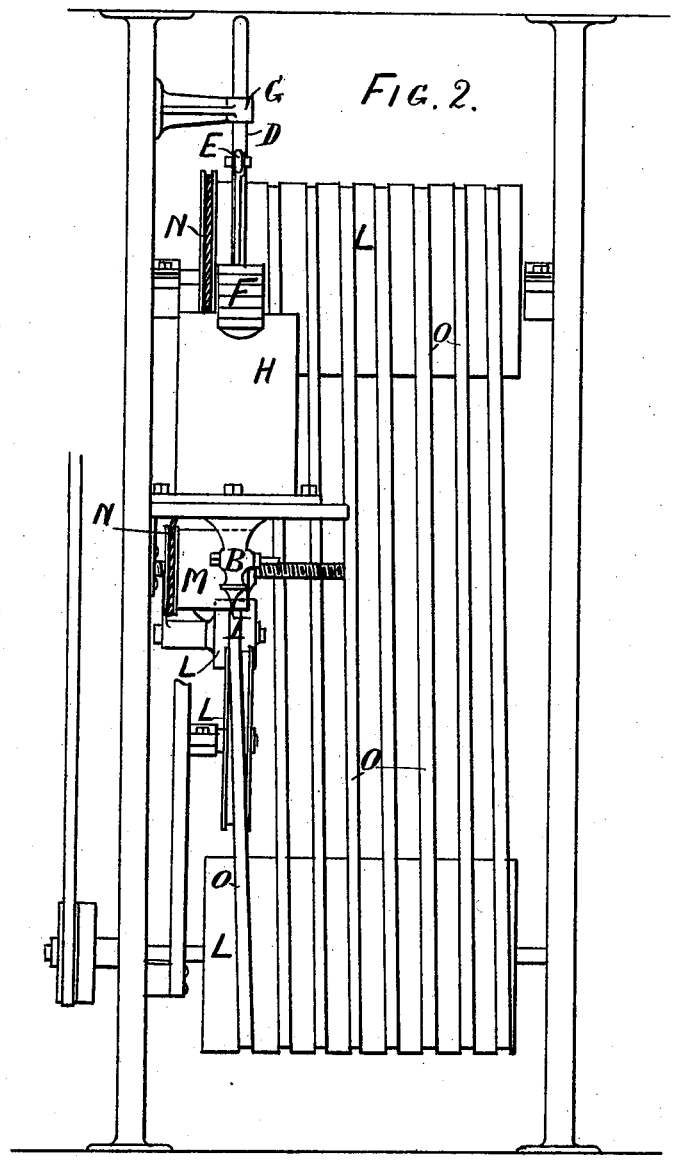

UNITED STATES PATENT OFFICE.

ADAM MILLAR, OF GLASGOW, SCOTLAND.

PROCESS OF OBTAINING USEFUL PRODUCTS FROM SILK-WORMS.

SPECIFICATION forming part of Letters Patent No. 594,888, dated December 7, 1897.

Application filed March 20, 1897. Serial No. 628,515. (No specimens.)

*To all whom it may concern:*

Be it known that I, ADAM MILLAR, manufacturer, of 45 Montrose Street, in the city of Glasgow, Scotland, have invented certain new and useful Improvements in Processes of Obtaining Useful Products from Silk-Worms, of which the following is a specification.

A well-known product of the silk-worm is obtained by treating the large intestine of the insect at a certain period of its life and drawing it and the gelatinous substance contained in it into threads upon a board or other support, which threads when dried are found to be very tough and very strong and practically unaffected by water.

My invention has for its object the obtaining of such threads in long continuous lengths, so as to be applicable to many purposes for which the comparatively short lengths of threads produced by the method commonly employed are not suitable. For that purpose I subject the gelatinous substance obtained from the large intestines of the silk-worms to pressure within a vessel having a fine outlet nozzle or nozzles, through which the gelatinous substance passes in the form of a filament and is led on to and drawn in a continuous length by a traveling band or a series of such bands, in passing over which it becomes sufficiently dry to permit of being wound into hanks or spools.

The accompanying drawings show, in Figure 1, a front view, and in Fig. 2 an end view, of the mechanical appliances employed in carrying out this invention.

A is a metal cylinder having a stop-cock B fitted to the lower end and a piston C, with piston-rod D, working in the upper part of the cylinder. The piston is actuated by the lever E, carrying the weight F. The upper end of the piston-rod is steadied by the guide G. The cylinder A has an outer lining or jacket H, containing water heated to a suitable temperature.

The stop-cock B is furnished with one or more nozzles or nipples I, projecting downward from its lower end. The stop-cock is also furnished with a tube J, which extends into the body of the cylinder. This tube is closed at the top and has a considerable number of small holes bored on its cylindrical sides. A piece of fine wire-gauze K is wrapped around the tube and is bound tightly at top and bottom by wire ties to form a strainer.

The cylinder is filled up with the gelatinous substance from the silk-worms. The worms are killed when they have attained their maximum size and are about to begin spinning. The intestines filled with the gelatinous substance are taken out and after being cut into two or more parts are placed in the cylinder. When the cylinder is full, the piston C is placed in position and is pressed downward by the weighted lever E. The stop-cock being open the liquid gelatin filters through the meshes of the wire-gauze and, filling the tube, issues in a thread-like stream from the nipple or nipples. The membrane or skin of the intestine, and also any foreign matter, falls down to the bottom of the cylinder. The threads of gelatin are led onto or fall upon a traveling band O of a long length—say one hundred yards—which is carried or wound in helical form upon the series of drums and pulleys L, of which one of the lower drums is driven by a belt from a steam-engine or other prime mover. The other drums and pulleys are driven by the traveling band. The traveling band has its upper surface coated with a varnish or paint which gives a non-adhesive surface to permit the thread of gelatin to be easily lifted from off the band when the band has nearly completed its course upon the series of drums.

The room or chamber in which the machine works is maintained at a temperature of 80° Fahrenheit, or even higher, so as to dry the threads of gelatin sufficiently to permit the thread being lifted off the band and wound onto the light winding-drum M. This light drum is driven by a cord or band N from one of the series of drums and has a speed corresponding to the speed of the traveling band. In order that the partly-dried threads may be kept exposed to the air as much as possible, the light drum M has a traveling motion upon its axis, and the thread by this means is laid upon the drum in the form of an open helix.

When the winding-drum has a sufficient amount of thread, it is taken off and another drum put in its place. The drums with the lengths of thread upon them are kept in a warm chamber until the thread is perfectly dry, when the thread is formed into skeins and hanks.

The gummy matter which is always associated with the gelatin of the silk-worm may be removed from the threads by soaking or boiling the hanks in soap and water or by any other suitable process.

The threads produced by this process may be employed as a substitute for horsehair in the manufacture of sieves, haircloth, and for making gimps, braids, laces, and other trimmings and as a substitute for bristles used in making brushes. For other purposes in which the natural stiffness and spring of these threads is found to be a disadvantage this objection may be lessened or removed by using threads of a considerable degree of fineness and combining several together by plaiting or twisting, which would produce a greater degree of pliability. Such combined threads may be used in place of threads of linen, cotton, or silk for many textile purposes.

The fineness of the threads of gelatin as produced by the method described is determined by the size of the bore or aperture of the nipples, by the temperature of the gelatin in the cylinder, and, lastly, by the speed of the traveling band.

The thread of gelatin as it leaves the nipple is sufficiently elastic to permit of its being drawn into very fine threads before it rests upon the surface of the traveling band.

The mechanical arrangements described may be varied in many ways as may be found convenient to suit different conditions. One important variation is to separate the gelatinous substance from the skin of the intestine previous to placing the gelatin in the cylinder. This may be done very quickly and economically by using the well-known machine, the "hydro-extractor." A large quantity of silk-worms—say a bushel—may be poured into a hydro-extractor fitted with a lining of very fine wire-gauze. A few minutes' working of the machine will be sufficient to kill the worms and extract all the liquid gelatin, leaving the skin and other solid parts in the form of a thick layer pressed to the sides of the wire-gauze lining. This layer may be easily removed and a fresh charge of worms supplied. The liquid gelatin thus obtained may be at once placed in the cylinders of the thread-making machine, already described, and formed into threads, or the gelatinous substance may be filled into jars and kept in a refrigerator until required, care being taken that the temperature is sufficiently low to prevent any fermentation or decomposition of the gelatin.

Having now described the invention, what I desire to claim and secure by Letters Patent is—

The herein-described process consisting in taking the large intestines of the silk-worms when they have attained the maximum size and are about to begin spinning, subjecting them to pressure without preliminary treatment to produce the threads, and then drying the threads, substantially as described.

Signed at Glasgow, Scotland, this 15th day of February, 1897.

ADAM MILLAR.

Witnesses:
JNO. ARMSTRONG, Jr.,
JOHN MORTON.